United States Patent
Sentani

(10) Patent No.: US 9,415,671 B2
(45) Date of Patent: Aug. 16, 2016

(54) DOOR WEATHER STRIP

(71) Applicant: NISHIKAWA RUBBER CO., LTD., Hiroshima-shi, Hiroshima-ken (JP)

(72) Inventor: Haruki Sentani, Hiroshima (JP)

(73) Assignee: NISHIKAWA RUBBER CO., LTD., Hiroshima-Shi, Hiroshima-Ken (JP)

( * ) Notice: Subject to any disclaimer, the term of this patent is extended or adjusted under 35 U.S.C. 154(b) by 0 days.

(21) Appl. No.: 14/924,177

(22) Filed: Oct. 27, 2015

(65) Prior Publication Data

US 2016/0144696 A1    May 26, 2016

(30) Foreign Application Priority Data

Nov. 20, 2014    (JP) .................................. 2014-235809

(51) Int. Cl.
*E06B 7/22*    (2006.01)
*B60J 10/00*    (2016.01)

(52) U.S. Cl.
CPC .............. *B60J 10/21* (2016.02); *B60J 10/0005* (2013.01); *B60J 10/0017* (2013.01); *B60J 10/0048* (2013.01); *B60J 10/22* (2016.02); *B60J 10/235* (2016.02); *B60J 10/248* (2016.02); *B60J 10/86* (2016.02)

(58) Field of Classification Search
CPC . B60J 10/0005; B60J 10/0017; B60J 10/0048
USPC ............................................. 49/479.1, 498.1
See application file for complete search history.

(56) References Cited

U.S. PATENT DOCUMENTS

| | | | | |
|---|---|---|---|---|
| 4,928,431 A | * | 5/1990 | Kuzuhara et al. | 49/479.1 |
| 5,127,193 A | * | 7/1992 | Okada et al. | 49/495.1 |
| 6,386,619 B1 | * | 5/2002 | Tsuchida | 296/146.9 |
| 8,973,307 B2 | * | 3/2015 | Eguchi | 49/476.1 |
| 2002/0058124 A1 | | 5/2002 | Nakajima et al. | |

(Continued)

FOREIGN PATENT DOCUMENTS

| | | |
|---|---|---|
| EP | 2703202 A2 | 3/2014 |
| JP | H05-000642 | 1/1993 |

(Continued)

OTHER PUBLICATIONS

Decision to Grant a Patent issued in Japanese Patent Application No. 2014-235809 dated Mar. 10, 2015 with English Translation (6 pages).

(Continued)

*Primary Examiner* — Jerry Redman
(74) *Attorney, Agent, or Firm* — Robert P. Michael, Esq.; Carter, DeLuca, Farrell & Schmidt, LLP

(57) ABSTRACT

A door weather strip includes an installation base member and a main seal part. A die molded part on a corner part connects an extrusion molded part on a roof side and an extrusion molded part on a pillar side. An installation base member of the extrusion molded part on the roof side has a foam seal lip. An installation base member of the die molded part has a die molded seal lip connected to the foam seal lip by die molding. Thickness of the die molded seal lip is thicker in a range from a position on a straight part on a roof side of the die molded part to a position on a curve than in a range from a position of connection between the extrusion molded part on the roof side and the die molded part to the position on the straight part on the roof side.

20 Claims, 6 Drawing Sheets

(56) References Cited

U.S. PATENT DOCUMENTS

| | | |
|---|---|---|
| 2004/0250474 A1 | 12/2004 | Kubo et al. |
| 2006/0107601 A1 | 5/2006 | Inagaki et al. |
| 2009/0056229 A1 | 3/2009 | Mugishima et al. |
| 2014/0075848 A1* | 3/2014 | Masumoto .................. 49/495.1 |
| 2015/0076868 A1* | 3/2015 | Sawada .................. 296/216.06 |

FOREIGN PATENT DOCUMENTS

| | | |
|---|---|---|
| JP | 3004016 B1 | 1/2000 |
| JP | 2001063382 A | 3/2001 |
| JP | 2002-127756 A | 5/2002 |
| JP | 2002307953 A | 10/2002 |
| JP | 4380935 | 10/2009 |
| JP | 2014-151810 | 8/2014 |
| JP | 5718519 B1 | 5/2015 |

OTHER PUBLICATIONS

Extended European Search Report from European Patent Appl. No. 15192396.8 dated Dec. 10, 2015 (5 pages).

Chinese Office Action issued by the State Intellectual Property Office (SIPO) in relation to Chinese Application No. 201510700376.8 dated Mar. 31, 2016 (4 pages).

* cited by examiner

I — I

V — V

III – III

IV – IV

II — II

DOOR WEATHER STRIP

CROSS REFERENCE TO RELATED APPLICATION

This application claims the benefit under 35 USC §119 of JP Patent Application JP 2014-235809 filed Nov. 20, 2014, the entire disclosure of which is incorporated herein by reference.

BACKGROUND INFORMATION

The present invention relates to door weather strips operatively coupled along peripheral edges of automobile doors for sealing spaces between doors and bodies by making elastic contact with the bodies of the automobiles.

As shown in FIG. 8 and FIG. 9, a door weather strip 10 has been operatively coupled along a peripheral edge of a door 1 of an automobile for sealing a space between the door 1 and an automobile body opening edge of a body 2.

As shown in FIG. 9, the door weather strip 10 is formed by connecting one end of a die molded part 70 to an end of an extrusion molded part 61, and another end of the die molded part 70 to an end of an extrusion molded part 62. The extrusion molded part 61 is operatively coupled on an upper part (roof side) of the peripheral edge of the door 1. The die molded part 70 is operatively coupled on an upper corner part 50 which is continuous with the upper part of the peripheral edge of the door 1.

In regard to the door weather strip 10, it has been well known to form a seal part 21 made of highly foamed sponge on a side of the door peripheral edge of an installation base member 11 (11a) of the extrusion molded part 61. According to the structure, as the door weather strip 10 is operatively coupled on the door, the seal part 21 made of the highly foamed sponge makes elastic contact with the peripheral edge of the door 1 for achieving an excellent sealing function (see, for example, Japanese Examined Patent Publication No. 4380935).

The door weather strip 10 of Japanese Examined Patent Publication No. 4380935, shown in FIG. 10 is formed by: positioning the end of the extrusion molded part 61 of the door weather strip 10 on a molding die not shown; fitting an end of the die molded part 70 to the end of the extrusion molded part 61 for integrally molding respective installation base members 11 (11a, 11c), respective main seal parts 12 (12a, 12c) having hollow shapes and respective sub seal parts 13 (13a, 13c) having lip shapes; and connecting the seal part 21 made of the highly foamed sponge to a seal part 22 of the installation base member 11 (11c) of the die molded part 70 for integral molding.

The seal part 22 of the installation base member 11 (11c) of the die molded part 70 and the seal part 21 made of the highly foamed sponge of the installation base member 11 (11a) of the extrusion molded part 61, which are integrally molded prevent water leak caused by submerged water.

The seal part 21 made of the highly foamed sponge is very soft, having low specific gravity that generally falls within a range of 0.05 to 0.4. On the other hand, the seal part 22 (generally made of solid material or sponge material of EPDM rubber or thermoplastic elastomer) of the installation base member 11 of the die molded part 70 has specific gravity higher than that of the seal part 21 made of the highly foamed sponge. Accordingly, fitting and connecting the seal part 21 to the seal part 22 by die molding requires operators' skills and is not simple.

More specifically, there have remained problems that: die molding material which flows toward the seal part 21 squeezes the seal part 21 made of the soft and highly foamed sponge during die molding; and the seal part 22 and the seal part 21 are not stably die molded. Since a resultant connecting surface is not flat, water enters an inner-cabin side from the connecting surface and an external appearance is degraded. After the seal part 21 connects with the seal part 22, a great difference in flexibility remains between the seal part 21 made of the soft and highly foamed sponge and the seal part 22 of the installation base member 11 (11c) of the die molded part 70. When the resultant door weather strip 10 is operatively coupled on a door panel including the door 1, bending stress from the seal part 21 made of the highly foamed sponge concentrates on a boundary on a position of connection, and then a connection may come off.

In this connection, the seal part 22 of the installation base member 11 (11c) of the die molded part 70 may have a lip shape thin in thickness for controlling pressure on a side of the seal part 21 made of the highly foamed sponge. But, the seal part 22 which is thin may be folded on a way of extension of the lip, may unintentionally be folded freely in a continuous longitudinal direction or may be wrinkled, thereby performing an insufficient sealing function. Also, as a cross sectional shape of the seal part 22 as a whole is miniaturized, the door panel may be out of reach of the seal part 22 having the lip shape.

As shown in FIG. 10, Japanese Examined Patent Publication No. 4380935 discloses that: the extrusion molded part 61 is positioned on the die while forming the seal part 21 made of the highly foamed sponge on the installation base member 11 (11a) into the lip shape toward a tip end surface; and the end of the die molded part 70 is connected to the end of the extrusion molded part 61. But Japanese Examined Patent Publication No. 4380935 does not disclose difficulty in connecting the seal part 21 made of the highly foamed sponge on the side of the extrusion molded part 61 to the seal part 22 on the side of the die molded part 70, or the shape necessary for the seal part 22.

Accordingly, an object of the present invention is to provide the door weather strips formed by stable die molding connection and capable of performing excellent sealing functions.

SUMMARY

In order to achieve the above-mentioned object, according to one aspect of the invention, a door weather strip is provided, the door weather strip including: an installation base member (11) operatively coupled on a peripheral edge of a door (1) of an automobile; and a main seal part (12) integrally molded with an inner-cabin side of the installation base member (11), the main seal part (12) making elastic contact with a door opening edge of a body (2) when the door (1) is in a closed position, whereby a die molded part (70) on a corner part (50) connects an extrusion molded part (61) on a roof side and an extrusion molded part (62) on a pillar side, an installation base member (11 (11a)) of said extrusion molded part (61) on the roof side has a super-soft seal lip (31) made of highly foamed sponge formed thereon, the super-soft seal lip (31) making elastic contact with the peripheral edge of said door (1), an installation base member (11 (11c)) of said die molded part (70) has a die molded seal lip (32) formed thereon, the die molded seal lip (32) making elastic contact with the peripheral edge of said door (1), the die molded seal lip (32) being connected to the super-soft seal lip (31) by die molding, wherein:

thickness (32C) of said die molded seal lip (32) is thicker: in a range from a position (40c) on a straight part (71) on a roof side of said die molded part (70) to a position (40d) on a curve (73); or in a range from the position (40c) on said straight part (71) on the roof side to a position (40e) on a straight part (72) on a pillar side close to said extrusion molded part (62) on the pillar side via said curve (73); than
thickness (32A) of said die molded seal lip (32) in a range (40a-40c) from a position of connection (40a) between said extrusion molded part (61) on the roof side and the die molded part (70) to the position (40c) on the straight part (71) on the roof side of said die molded part (70).

In addition, according to an aspect of the present invention, said super-soft seal lip (31) lowers (31T3→31T1) in height (31T) and thins (31S3→31S1) in thickness (31S) towards said position of connection (40a); and said super-soft seal lip (31) is made to have a cross sectional shape (height and thickness) substantially the same as said die molded seal lip (32) on said position of connection (40a) and comes into contact with said die molded seal lip (32) on said position of connection (40a).

In addition, according to an aspect of the present invention, said super-soft seal lip (31) lowers (31T3→31T1) in height (31T) and thins (31S3→31S1) in thickness (31S) towards said position of connection (40a); and said super-soft seal lip (31) is thicker than the thickness (32A) of said die molded seal lip (32) and comes into contact with said die molded seal lip (32) on said position of connection (40a).

In addition, according to an aspect of the present invention, the height (31T) and the thickness (31S) of said super-soft seal lip (31) is transformed by compression during the die molding; and then said super-soft seal lip (31) connects with the die molded seal lip (32).

In addition, according to an aspect of the present invention, said die molded seal lip (32) is substantially perpendicular to said installation base member (11 (11c)) from the position of connection (40a) to the position (40c) on the straight part (71) on the roof side of said die molded part (70); and said die molded seal lip (32) inclines towards an outer-cabin side with respect to said installation base member (11 (11c)) from the position (40c) on the straight part (71) on the roof side of said die molded part (70) to the position (40d) on said curve (73).

In addition, according to an aspect of the present invention, an outer-cabin side of a base root of the super-soft seal lip (31) formed on said installation base member (11 (11a)) is closer to the peripheral edge of said door (1) than an inner-cabin side, thereby forming the super-soft seal lip (31) on an uneven base; and height (31T2) from a top end of said super-soft seal lip (31) to the inner-cabin side of the base root is higher than height (31T1) from the top end of said super-soft seal lip (31) to the outer-cabin side of the base root.

Symbols in parentheses show constituents or items corresponding to the drawings.

According to the present invention, the thickness of the die molded seal lip on the installation base member of the die molded part is thicker in the range from the position on the straight part on the roof side of the die molded part to the position on the curve or to the position on the straight part on the pillar side close to the extrusion molded part on the pillar side via the curve, as compared with the thickness of the die molded seal lip in the range from the position of connection between the extrusion molded part on the roof side and the die molded part to the position on the straight part on the roof side of the die molded part. Accordingly, on the position of connection, the die molded seal lip of the die molded part is thin in the thickness and is soft and excellent in bendability in the same manner as the super-soft seal lip made of the highly foamed sponge. As a result, a connection does not come off on a boundary on the position of connection. Also, the structure, in which the die molded seal lip thin in the thickness is subjected to surface pressure from the super-soft seal lip connecting with the die molded seal lip, prevents a sharp change in the surface pressure.

The die molded seal lip which is thin in the thickness is transformed to the die molded seal lip which is thicker in the thickness on the curve. The structure prevents the die molded seal lip thin in the thickness, or the super-soft seal lip connecting with the die molded seal lip as well as the die molded seal lip thin in the thickness, from falling down toward the outer-cabin side around the position of connection and becoming unstable. In addition, as the die molded seal lip thin in the thickness comes into contact with the super-soft seal lip made of the highly foamed sponge for connection by die molding, pressure from die molding material which flows toward the super-soft seal lip is weaker as compared with the die molded seal lip which is thick in the thickness. The structure prevents an unstable die molding.

As a result, the door weather strip capable of performing sufficient sealing function is provided.

The die molded seal lip thick in the thickness may be formed into a so-called rib shape which is hardly folded on a way of extension and which bends only at the base root. The resultant die molded seal lip thick in the thickness does not sway towards the inner-cabin side or the outer-cabin side freely when operatively coupled on the door, and is operatively coupled on the door stably.

In addition, the super-soft seal lip lowers in the height and thins in the thickness towards the position of connection; and the super-soft seal lip is made to have the cross sectional shape substantially the same as the die molded seal lip on the position of connection and comes into contact with the die molded seal lip on the position of connection. The structure prevents degradation in external appearance of the connecting surface or decline in sealing performance, caused by overflow of the die molding material.

In addition, the super-soft seal lip lowers in the height and thins in the thickness towards the position of connection; and the super-soft seal lip is thicker than the thickness of the die molded seal lip, and comes into contact with the die molded seal lip on the position of connection. Accordingly, the super-soft seal lip receives the pressure from the die molding material and can deal with irregularity when coming into contact with the die molded seal lip.

In addition, the height and the thickness of the super-soft seal lip is transformed by the compression during the die molding. Accordingly, the super-soft seal lip is heightened in density and does not crush easily when subjected to the pressure from the die molding material.

In addition, the die molded seal lip is substantially perpendicular to the installation base member from the position of connection to the position on the straight part on the roof side of the die molded part; and the die molded seal lip inclines towards the outer-cabin side with respect to the installation base member from the position on the roof side of the die molded part to the position on the curve. Accordingly, when the door weather strip is operatively coupled on the door, the die molded seal lip thin in the thickness, or the super-soft seal lip connecting with the die molded seal lip as well as the die molded seal lip thin in thickness, inclines towards the outer-cabin side from beginning. This is because the die molded seal lip which is thick in thickness and which inclines towards the outer-cabin side pulls the die molded seal lip thin in thickness or the super-soft seal lip connecting with the die molded seal lip towards the outer-cabin side. The structure forcibly fixes a sealing direction of the die molded seal lip or the super-soft seal lip. The structure prevents the die molded seal lip and the super-soft seal lip from unintentionally being folded freely in the continuous longitudinal direction or being wrinkled, thereby achieving a more stable sealing function.

The die molded seal lip thick in thickness which inclines towards the outer-cabin side may be formed into the rib shape. The die molded seal lip having the rib shape is hardly folded on the way of extension or does not bend at the base root. As a result, operatively coupling the die molded part on the corner part of the door is further simplified.

In addition, the installation base member having the super-soft seal lip formed thereon includes difference in level by the unevenness. Specifically, the height from the top end of the super-soft seal lip to the inner-cabin side of the base root is higher than the height from the top end of the super-soft seal lip to the outer-cabin side of the base root. When the super-soft seal lip is subjected to force falling towards the outer-cabin side, force acts for raising the super-soft seal lip. As a result, the super-soft seal lip does not fall down easily.

Japanese Examined Patent Publication No. 4380935 does not disclose that the die molded seal lip, which connects with the super-soft seal lip on the extrusion molded part of the door weather strip by die molding, is transformed to be thick in a cross sectional shape within the die molded part.

DETAILED DESCRIPTION

Figure 1:
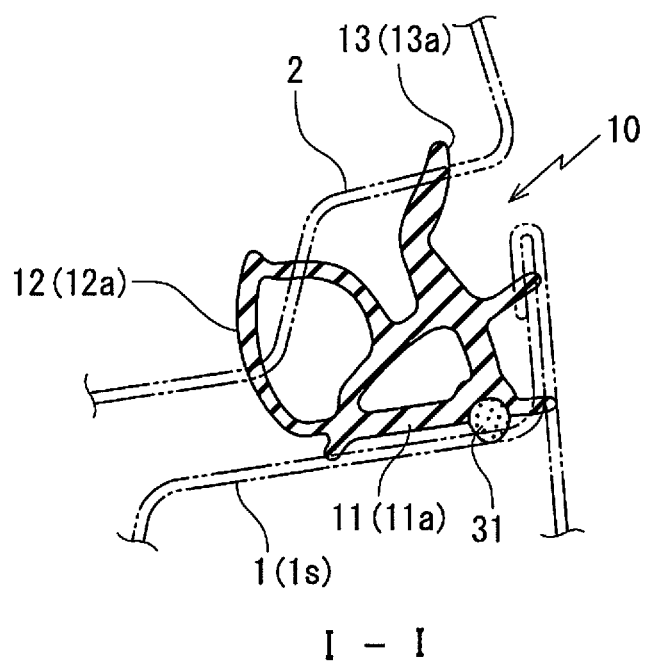
FIG. 1 is an I-I line enlarged cross section of FIG. 9 showing a door weather strip according to an embodiment of the present invention.

Referring to the Drawings, a door weather strip according to an embodiment of the present invention will be described. When constituents or items correspond to those in prior arts, the same symbols are used.

Figure 8:
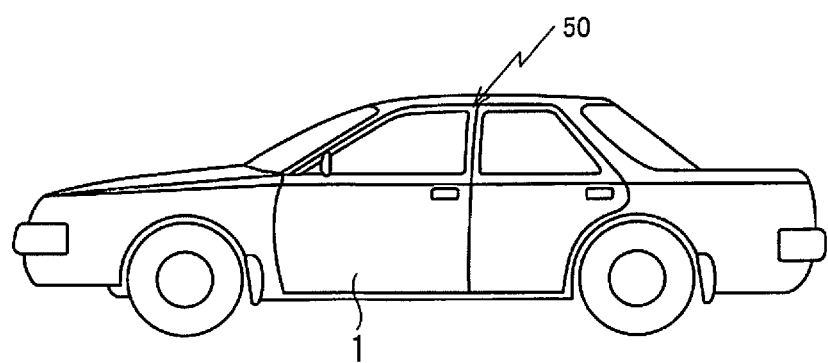
FIG. 8 is an external side view of an automobile.
Figure 9:
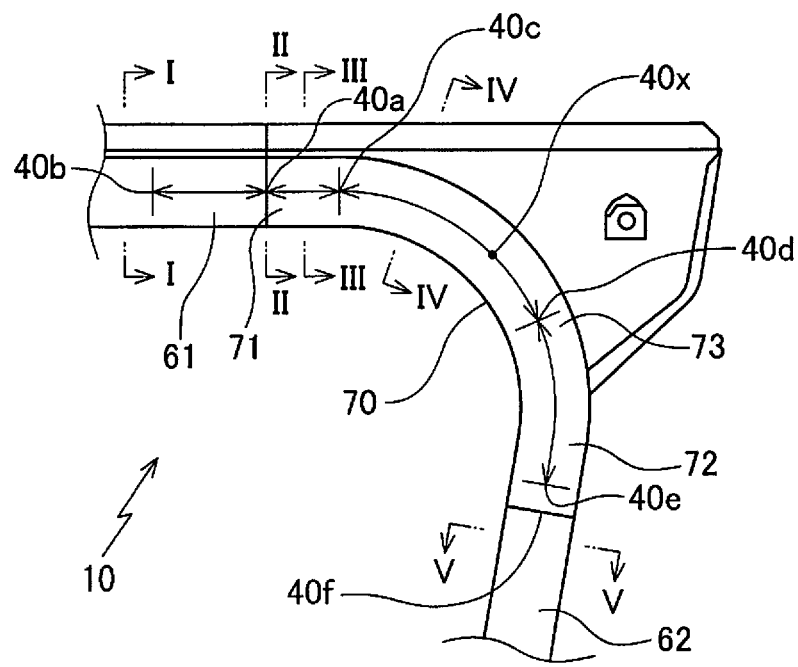
FIG. 9 is a side view of an upper corner part of the door weather strip.
Figure 10:
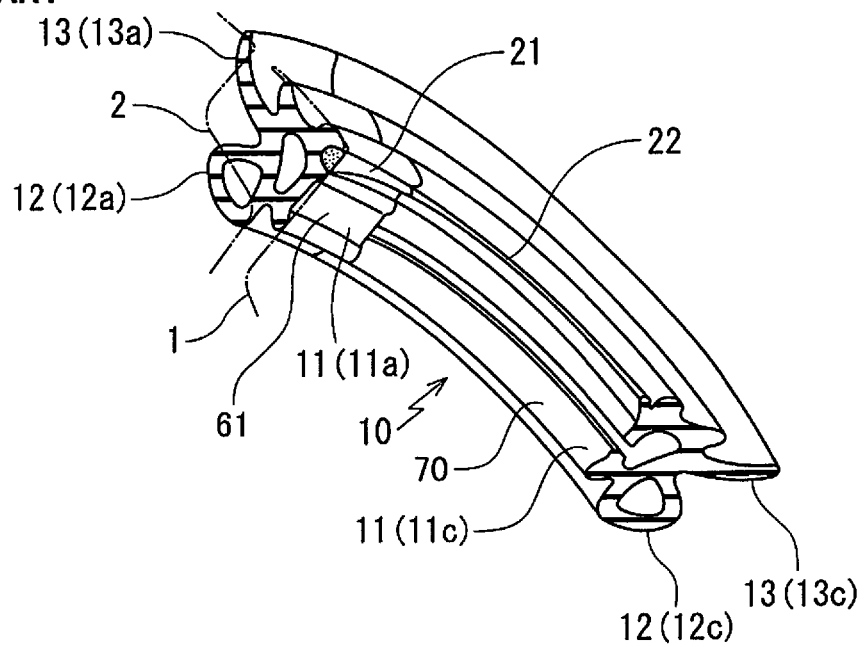
FIG. 10 is a perspective view of important parts of a door weather strip of a prior art.

As shown in FIG. 8 and FIG. 9, in a door weather strip 10, one end of a die molded part 70 on an upper corner part 50 of a door 1 connects with an end of an extrusion molded part 61 on a roof side, and another end of the die molded part 70 connects with an end of an extrusion molded part 62 on a pillar side. The extrusion molded part 61 on the roof side extends from a front side of an automobile toward a rear side, when the door 1 is in a closed position. The extrusion molded part 62 on the pillar (lower) side extends from a lower side of the automobile to an upper side.

As shown in FIG. 1 (I-I line cross section of FIG. 9), the extrusion molded part 61 on the roof side includes: an installation base member 11 (11a); a main seal part 12 (12a); and a sub seal part 13 (13a). The installation base member 11 (11a) is operatively coupled on a door panel 1s provided on a peripheral edge of the door 1 by a clip not shown. The main seal part 12 (12a) has a hollow shape, is integrally molded with an inner-cabin side of the installation base member 11 (11a) and makes elastic contact with an inner-cabin side of an automobile body opening edge of a body 2 when the door 1 is in the closed position for sealing an outside and an inside of the automobile. The sub seal part 13 (13a) has a shape of a lip, is integrally molded with an outer-cabin side of the installation base member 11 (11a) and makes elastic contact with an outer-cabin side of the automobile body opening edge of the body 2 together with the main seal part 12 (12a) when the door 1 is in the closed position for sealing the outside and the inside of the automobile.

A super-soft seal lip 31 made of highly foamed sponge is formed on a position which is on an outer-cabin side of the installation base member 11 (11a), which is on a side of the peripheral edge of the door 1 and, more specifically, which is on a side of an installation surface of the door panel 1s extending levelly. The super-soft seal lip 31 protrudes from the installation base member 11 (11a).

The super-soft seal lip 31 made of foamed rubber of EPDM is very soft, having specific gravity that falls within a range of 0.05 to 0.4. The super-soft seal lip 31, by making elastic contact with the peripheral edge of the door 1, performs an excellent sealing function.

Figure 2:
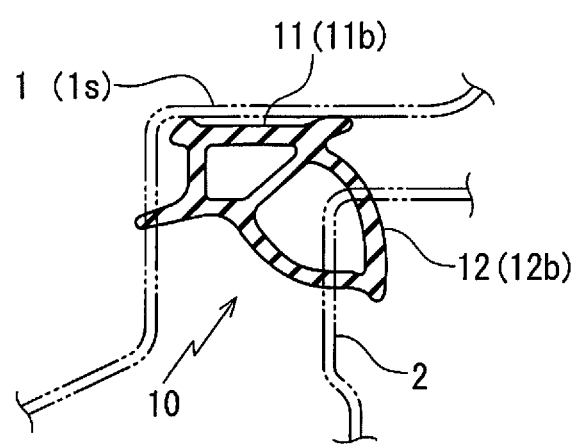
FIG. 2 is a V-V line enlarged cross section of FIG. 9 showing the door weather strip according to the embodiment of the present invention.

As shown in FIG. 2 (V-V line cross section of FIG. 9), the extrusion molded part 62 on the pillar (lower) side includes: an installation base member 11 (11b); and a main seal part 12 (12b). In a different manner from the extrusion molded part 61 on the roof side, the extrusion molded part 62 on the pillar (lower) side does not include the sub seal part 13 or the super-soft seal lip 31. The installation base member 11 (11b) is operatively coupled on the door panel is provided on the peripheral edge of the door 1. The main seal part 12 (12b) has a hollow shape, is integrally molded with an inner-cabin side of the installation base member 11 (11b) and makes elastic contact with the inner-cabin side of the automobile body opening edge of the body 2 when the door 1 is in the closed position for sealing the outside and the inside of the automobile.

Figure 3:
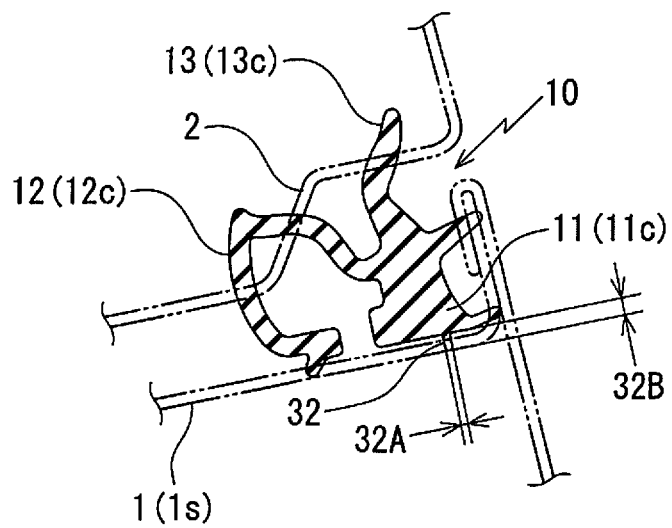
FIG. 3 is a line enlarged cross sections of FIG. 9 showing the door weather strip according to the embodiment of the present invention.

As shown in FIG. 3, the die molded part 70 of the door weather strip 10 on the upper corner part 50 of the door 1 includes: an installation base member 11 (11c); a main seal part 12 (12c); and a sub seal part 13 (13c). The installation base member 11 (11c) is operatively coupled on the door panel 1s provided on the peripheral edge of the door 1. The main seal part 12 (12c) has the hollow shape, is integrally molded with an inner-cabin side of the installation base member 11 (11c) and makes elastic contact with the inner-cabin side of the automobile body opening edge of the body 2 when the door 1 is in the closed position for sealing the outside and the inside of the automobile. The sub seal part 13 (13c) has the shape of the lip, is integrally molded with an outer-cabin side of the installation base member 11 (11c) and makes elastic contact with the outer-cabin side of the automobile body opening edge of the body 2 together with the main seal part 12 (12c) when the door 1 is in the closed position for sealing the outside and the inside of the automobile.

A die molded seal lip 32 is formed on a position which is on an outer-cabin side of the installation base member 11 (11c), which is on the side of the peripheral edge of the door 1 and, more specifically, which is on the side of the installation surface of the door panel 1s extending levelly. The die molded seal lip 32 protrudes from the installation base member 11 (11c). The die molded seal lip 32 is molded simultaneously and integrally with the die molded part 70 of the door weather strip 10. The die molded seal lip 32 is generally made of solid material or sponge material of EPDM rubber or thermoplastic elastomer and has a specific gravity more than 0.4.

In the present embodiment, the end of the extrusion molded part 61 and the end of the extrusion molded part 62 of the door weather strip 10 are positioned on a molding die not shown, and are subjected to molding by the die. In the die, a cross sectional shape of the super-soft seal lip 31 of the extrusion molded part 61 on the roof side is transformed and a cross sectional shape of the die molded seal lip 32 of the die molded part 70 is transformed in a length direction. The resultant die molded seal lip 32 connects with the resultant super-soft seal lip 31.

Figure 6:
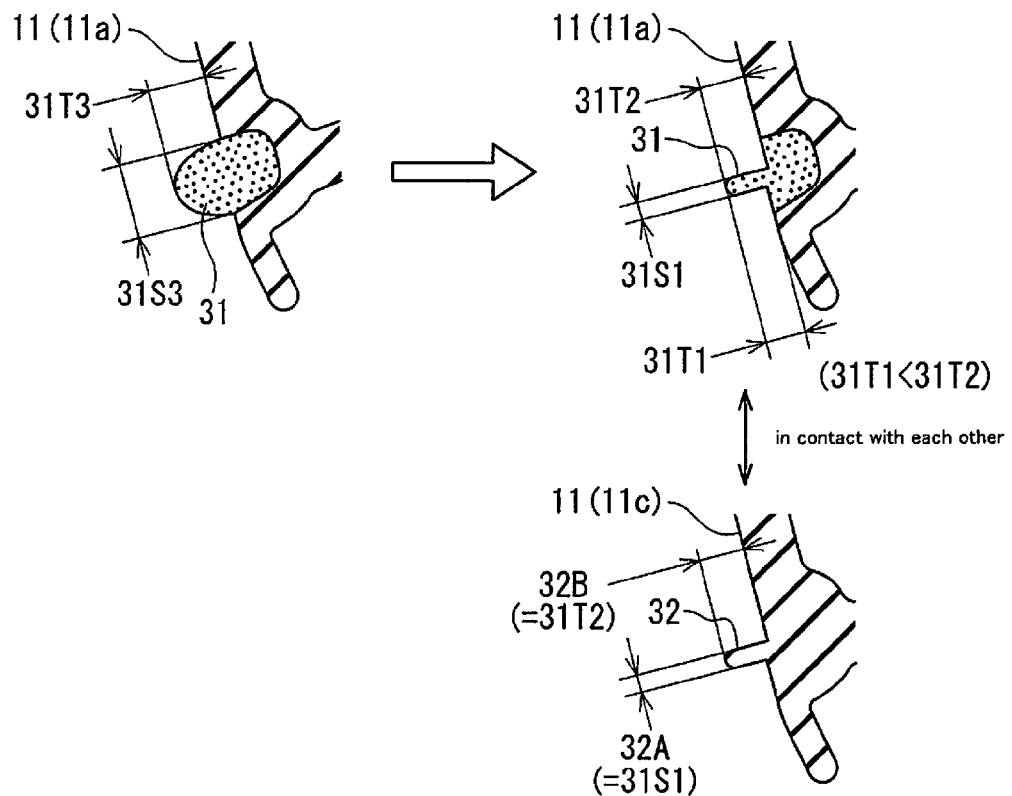
FIG. 6 is a group of cross sections of important parts including: a state that a super-soft seal lip on the door weather strip according to the embodiment of the present invention is pressed; and a die molded seal lip which comes into contact with the super-soft seal lip.

As shown by a cross sectional shape in FIG. 6, the super-soft seal lip 31 is $\alpha$ in height 31T3 and $\beta$ in thickness 31S3, except for a position on the end of the extrusion molded part 61 on the roof side close to the die molded part 70. On a position of connection 40a between the extrusion molded part 61 on the roof side and the die molded part 70, the super-soft seal lip 31 is $\gamma$ in height 31T1 and $\delta$ in thickness 31S1. The height 31T1 is lower than the height 31T3 by 10 to 30% and the thickness 31S1 is thinner than the thickness 31S3 by 70 to 90%. On the position of connection 40a, the super-soft seal lip 31 is substantially perpendicular to the installation base member 11.

During die molding, a cross sectional shape of the super-soft seal lip 31 in a range 40a-40b is gradually transformed in the height (31T) and the thickness (31S) by compression by the die. More specifically, from a position 40b on the extrusion molded part 61 on the roof side towards the position of connection 40a shown in FIG. 9 (10 mm in the present embodiment), the super-soft seal lip 31 lowers (31T3→31T1) in the height (31T) and thins (31S3→31S1) in the thickness (31S). The cross sectional shape of the super-soft seal lip 31 is not necessarily transformed gradually, and may be transformed by adding difference in level. Also, only a part of the super-soft seal lip 31 adjacent to the position of connection 40a may be transformed.

The cross sectional shape of the super-soft seal lip 31 is transformed by compressing (pressing) the super-soft seal lip 31 by 10 to 30% in a height direction and 70 to 90% in a thickness direction.

The super-soft seal lip 31 is made to have a cross sectional shape (height and thickness) the same as (or substantially the same as) the die molded seal lip 32 on the position of connection 40a, and comes into contact with the die molded seal lip 32 on the position of connection 40a. As shown in FIG. 3, on the position of connection 40a, the die molded seal lip 32 is $\gamma$ in height 32B and $\delta$ in thickness 32A.

As shown in FIG. 6, on the position of connection 40a, an outer-cabin side position of a base root of the super-soft seal lip 31 formed on the installation base member 11 (11a) is closer to the peripheral edge of the door 1 than an inner-cabin side position, thereby forming the super-soft seal lip 31 on an uneven base (including difference in level). In other words, height 31T2 from a top end of the super-soft seal lip 31 to the inner-cabin side of the base root is higher than the height 31T1 from the top end of the super-soft seal lip 31 to the outer-cabin side of the base root (31T1<31T2).

Accordingly, when the super-soft seal lip 31 is subjected to force falling down towards the outer-cabin side, the super-soft seal lip 31 stands up and does not fall easily.

In a range 40a-40c shown in FIG. 9, (10 mm in the present embodiment) from the position of connection 40a between the extrusion molded part 61 on the roof side and the die molded part 70 to the position 40c on the straight part 71 on the roof side of the die molded part 70, the die molded seal lip 32 is stable in height and thickness. More specifically, as shown by the cross-sectional shape in FIG. 3, the die molded seal lip 32 is $\gamma$ in the height 32B and $\delta$ in the thickness 32A. The die molded seal lip 32 is substantially perpendicular to the installation base member 11 (11c).

Figure 4:
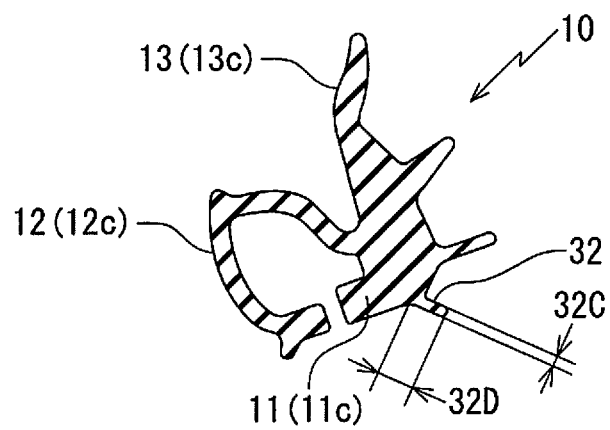
FIG. 4 is a IV-IV line enlarged cross sections of FIG. 9 showing the door weather strip according to the embodiment of the present invention.
Figure 5:
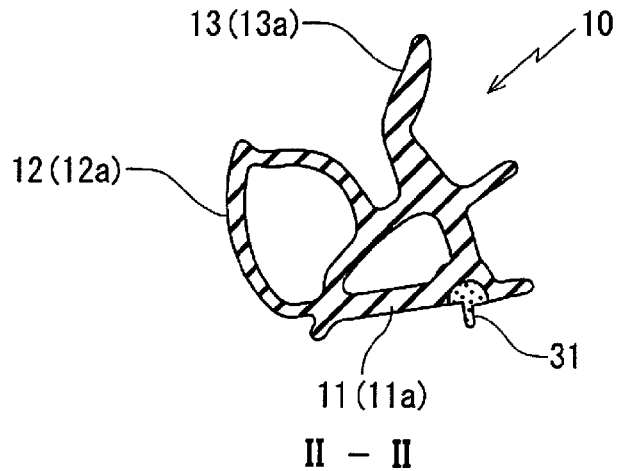
FIG. 5 is a II-II line (boundary on a position of connection) enlarged cross sections of FIG. 9 showing the door weather strip according to the embodiment of the present invention.

In a range 40c-40d shown in FIG. 9, from the position 40c on the straight part 71 on the roof side of the die molded part 70 to a position 40d on a curve 73, as shown by the cross-sectional shape in FIG. 4, height 32D of the die molded seal lip 32 is as high as or higher than $\alpha$ in the height 31T3, thickness 32C is twice as thick as the thickness 32A or more and the die molded seal lip 32 inclines towards the outer-cabin side with respect to the installation base member 11 (11c). In the present embodiment, the position 40d is lower than a position 40x as the largest radius of curvature of the curve 73. In other words, the die molded seal lip 32 is higher in the height and thicker in the thickness in the range 40c-40d than in the range 40a-40c. The thickness may be transformed by gradually transforming the cross sectional shape or by adding the difference in level. The die molded seal lip 32, having the thickness 32C which is twice as thick the thickness 32A or more, is high in rigidity and is hardly folded on a way of extension. The die molded seal lip 32 may also be formed into a so-called rib shape which is not folded on the way of extension and bends only at the base root.

In the present embodiment, the die molded seal lip 32 is thick in thickness up to the position 40d on the curve 73 shown in FIG. 9. But the die molded seal lip 32 may be high in the height and thick in the thickness in a longer range up to a position 40e on a straight part 72 on a pillar side close to the extrusion molded part 62 on the pillar side via the curve 73 (or up to a position of connection 40f between the extrusion molded part 62 on the pillar side and the die molded part 70). Also, only the thickness of the die molded seal lip 32 may be thickened and the height may be the same.

According to the above-structured door weather strip 10, the thickness of the die molded seal lip 32 on the installation base member 11 (11c) of the die molded part 70 is thicker in the range 40c-40d from the position 40c on the straight part 71 on the roof side of the die molded part 70 to the position 40d on the curve 73 than in the range 40a-40c from the position of connection 40a between the extrusion molded part 61 on the roof side and the die molded part 70 to the position 40c on the straight part 71 on the roof side of the die molded part 70. The structure that the die molded seal lip 32 thin in the thickness 32A receives surface pressure from the super-soft seal lip 31 connecting with the die molded seal lip 32 on the position of connection 40a prevents a sharp change in the surface pressure. Also, since the super-soft seal lip 31 connects with the die molded seal lip 32 thin in the thickness 32A, which is soft and excellent in bendability in the same manner as the super-soft seal lip 31 made of highly foamed sponge, a connection does not come off on a boundary on the position of connection.

The die molded seal lip 32 which is thin in the thickness 32A is transformed to the die molded seal lip 32 which is thicker in the thickness 32C on the curve 73. The structure prevents the die molded seal lip 32 which is thin in the thickness 32A from unintentionally being folded freely in a continuous longitudinal direction or wrinkled around the position of connection 40a. In addition, as the die molded seal lip 32 which is thin in the thickness 32A comes into contact with the super-soft seal lip 31 for connection by die molding, pressure from die molding material which flows toward the super-soft seal lip 31 is weaker as compared with the die molded seal lip 32 which is thick in the thickness. The structure prevents an unstable die molding. The die molded seal lip 32 which is thick in the thickness 32C is high in rigidity and is hardly folded on a way of extension. Accordingly, the die molded seal lip 32 does not sway towards the inner-cabin side or the outer-cabin side easily when operatively coupled on the door, and is operatively coupled on the door stably.

In addition, the super-soft seal lip 31 lowers (31T3→31T1) in the height 31T and thins (31S3→31S1) in the thickness 31S towards the position of connection 40a; and the super-soft seal lip 31 is made to have the cross sectional shape the same as (or substantially the same as) the die molded seal lip 32 on the position of connection 40a and comes into contact with the die molded seal lip 32 on the position of connection 40a. The structure prevents degradation in external appearance of the connecting surface or decline in sealing performance, caused by overflow of the die molding material.

In addition, the height 31T and the thickness 31S of the super-soft seal lip 31 is transformed by the compression. Accordingly, the super-soft seal lip is heightened in density, is prevented from falling down toward the outer-cabin side and does not crush easily when subjected to the pressure from the die molding material.

In addition, the die molded seal lip 32 is substantially perpendicular to the installation base member 11 (11c) from the position of connection 40a to the position 40c on the straight part 71 on the roof side of the die molded part 70; and the die molded seal lip 32 inclines towards the outer-cabin side with respect to the installation base member 11 (11c) from the position 40c on the straight part 71 on the roof side of the die molded part 70 to the position 40d on the curve 73. Accordingly, when the door weather strip 10 is operatively coupled on the door 1, the die molded seal lip 32 thin in the thickness 32A, or the super-soft seal lip 31 connecting with the die molded seal lip 32 as well as the die molded seal lip 32 thin in the thickness 32A, inclines towards the outer-cabin side from beginning. This is because the die molded seal lip 32 which inclines towards the outer-cabin side and which is thick in the thickness 32C pulls the die molded seal lip 32 thin in thickness 32A or the super-soft seal lip 31 connecting with the die molded seal lip 32 towards the outer-cabin side.

The structure forcibly fixes a sealing direction of the die molded seal lip 32 or the super-soft seal lip 31, thereby achieving a more stable sealing function. In addition, when the die molded seal lip 32 thick in the thickness 32C has the rib shape, operatively coupling the die molded part 70 on the corner part 50 of the door 1 is further simplified.

In the present embodiment, the super-soft seal lip 31 is made to have the same cross sectional shape as the die molded seal lip 32 on the position of connection 40a and comes into contact with the die molded seal lip 32 on the position of connection 40a between the extrusion molded part 61 on the roof side and the die molded part 70. But, as shown in FIG. 7, the super-soft seal lip 31 may be made to have thickness 31S1 thicker than thickness 32A of the die molded seal lip 32 and come into contact with the die molded seal lip 32.

Figure 7:
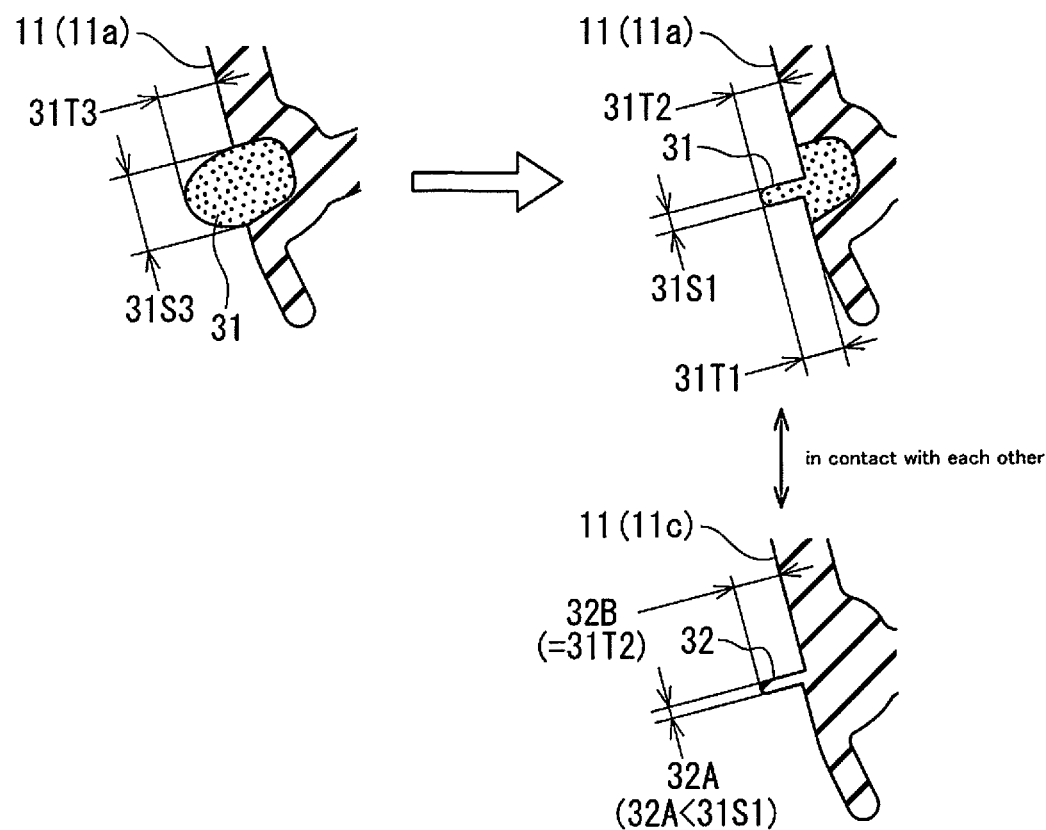
FIG. 7 is a group of cross sections of important parts including: a state that a super-soft seal lip on a door weather strip according to another embodiment of the present invention is pressed; and a die molded seal lip which comes into contact with the super-soft seal lip.

In FIG. 7, the thickness 31S1 of the super-soft seal lip 31 is δ and the thickness 32A of the die molded seal lip 32 is thinner than δ by 30 to 40%. Height of the super-soft seal lip 31 may also be higher than the die molded seal lip 32, but is the same as the die molded seal lip 32 in FIG. 7. The die molded seal lip 32, having the thickness 32A thinner than δ by 30 to 40% and the height 32B of γ, is substantially perpendicular to the installation base member 11 from the position of connection 40a to the position 40c on the straight part 71 on the roof side of the die molded part 70. The die molded seal lip 32, having the thickness 32C three times as thick as the thickness 32A and height 32D of α which is the same as 31T3, inclines towards the outer-cabin side with respect to the installation base member 11 from the position 40c on the straight part 71 on the roof side of the die molded part 70 to the position 40d on the curve 73.

According to the structure, the super-soft seal lip 31 receives the pressure from the die molding material and can deal with irregularity when coming into contact with the die molded seal lip 32.

Use of the present invention is not limited to the corner or a connecting part shown in FIG. 8 and FIG. 9, and is applicable to any connecting part between the seal part made of the highly foamed sponge on the extrusion molded part and the seal part which is continuous with the seal part made of the highly foamed sponge and formed by die molding.

Figure 11:
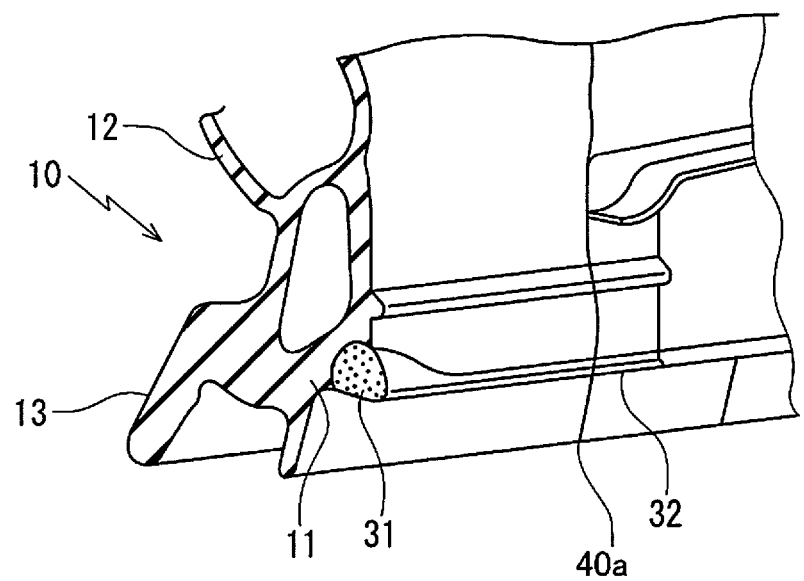
FIG. 11 is an enlarged cross section of important parts around II-II line (boundary on the position of connection) of FIG. 9 showing the door weather strip according to the embodiment of the present invention.

As shown in FIG. 11, the super-soft seal lip 31 may be compressed in a sole direction from the inner-cabin side to the outer-cabin side in a manner that an outer-cabin side surface of the super-soft seal lip 31 extends without a warp (keeping the position of the outer-cabin side surface) and the super-soft seal lip 31 connects with the die molded seal lip 32.

The structure enables smooth drainage of water in a range from the extrusion molded part 61 to the die molded part 70 on the corner 50, which enters from the outer-cabin side on the roof side.

I claim:

1. A door weather strip comprising: an installation base member operatively coupled on a peripheral edge of a door of an automobile; and a main seal part integrally molded with an inner-cabin side of the installation base member, the main seal part making elastic contact with a door opening edge of a body when the door is in a closed position, whereby a die molded part on a corner part connects an extrusion molded part on a roof side and an extrusion molded part on a pillar side, an extrusion molded part installation base member on the roof side has a foam seal lip made of highly foamed sponge formed thereon, the foam seal lip making elastic contact with the peripheral edge of said door, a die molded part installation base member has a die molded seal lip formed thereon, the die molded seal lip making elastic contact with the peripheral edge of said door, the die molded seal lip being connected to the foam seal lip by die molding, wherein:

thickness of said die molded seal lip is thicker: in a range from a position on a straight part on a roof side of said die molded part to a position on a curve; or in a range from the position on said straight part on the roof side to a position on a straight part on the pillar side close to said extrusion molded part on the pillar side via said curve; than thickness of said die molded seal lip in a range from a position of connection between said extrusion molded part on the roof side and the die molded part to the position on the straight part on the roof side of said die molded part.

2. The door weather strip as claimed in claim 1, wherein: said foam seal lip has a height and thickness, the foam seal lip lowers in height and reduces in thickness towards said position of connection; and said seal lip is made to have a cross sectional shape substantially similar to a cross sectional shape of said die molded seal lip and comes into contact with said die molded seal lip at said position of connection.

3. The door weather strip as claimed in claim 2, wherein: the height and a thickness of said foam seal lip is transformed by compression during die molding; and said foam seal lip connects with the die molded seal lip.

4. The door weather strip as claimed in claim 3, wherein: said die molded seal lip is substantially perpendicular to said die molded part installation base member from the position of connection to the position on the straight part on the roof side of said die molded part; and said die molded seal lip inclines towards an outer-cabin side with respect to said die molded part installation base member from the position on the straight part on the roof side of said die molded part to the position on said curve.

5. The door weather strip as claimed in claim 4, wherein: a surface on an outer-cabin side of a base root as a border of the foam seal lip formed on a surface of said extrusion molded part installation base member is closer to the peripheral edge of said door than a surface on an inner-cabin side, thereby forming the foam seal lip on an uneven base; and a height from a top end of said foam seal lip to the surface on the inner-cabin side of the base root is higher than a height from the top end of said foam seal lip to the surface on the outer-cabin side of the base root.

6. The door weather strip as claimed in claim 3, wherein: a surface on an outer-cabin side of a base root as a border of the foam seal lip formed on a surface of said extrusion molded part installation base member is closer to the peripheral edge of said door than a surface on an inner-cabin side, thereby forming the foam seal lip on an uneven base; and a height from a top end of said foam seal lip to the surface on the inner-cabin side of the base root is higher than a height from the top end of said foam seal lip to the surface on the outer-cabin side of the base root.

7. The door weather strip as claimed in claim 2, wherein: said die molded seal lip is substantially perpendicular to said die molded part installation base member from the position of connection to the position on the straight part on the roof side of said die molded part; and said die molded seal lip inclines towards an outer-cabin side with respect to said die molded part installation base member from the position on the straight part on the roof side of said die molded part to the position on said curve.

8. The door weather strip as claimed in claim 7, wherein: a surface on an outer-cabin side of a base root as a border of the foam seal lip formed on a surface of said extrusion molded part installation base member is closer to the peripheral edge of said door than a surface on an inner-cabin side, thereby forming the foam seal lip on an uneven base; and a height from a top end of said foam seal lip to the surface on the inner-cabin side of the base root is higher than a height from the top end of said foam seal lip to the surface on the outer-cabin side of the base root.

9. The door weather strip as claimed in claim 2, wherein: a surface on an outer-cabin side of a base root as a border of the foam seal lip formed on a surface of said extrusion molded part installation base member is closer to the peripheral edge of said door than a surface on an inner-cabin side, thereby forming the foam seal lip on an uneven base; and a height from a top end of said foam seal lip to the surface on the inner-cabin side of the base root is higher than a height from the top end of said foam seal lip to the surface on the outer-cabin side of the base root.

10. The door weather strip as claimed in claim 1, wherein: said foam seal lip has a height and thickness, the foam seal lip lowers in height and thins in thickness towards said position of connection; and said foam seal lip is thicker than a thickness of said die molded seal lip and comes into contact with said die molded seal lip on said position of connection.

11. The door weather strip as claimed in claim 10, wherein: the height and the thickness of said foam seal lip is transformed by compression during the die molding; and said foam seal lip connects with the die molded seal lip.

12. The door weather strip as claimed in claim 11, wherein: said die molded seal lip is substantially perpendicular to said die molded part installation base member from the position of connection to the position on the straight part on the roof side of said die molded part; and said die molded seal lip inclines towards an outer-cabin side with respect to said die molded part installation base member from the position on the straight part on the roof side of said die molded part to the position on said curve.

13. The door weather strip as claimed in claim 12, wherein: a surface on an outer-cabin side of a base root as a border of the foam seal lip formed on a surface of said extrusion molded part installation base member is closer to the peripheral edge of said door than a surface on an inner-cabin side, thereby forming the foam seal lip on an uneven base; and a height from a top end of said foam seal lip to the surface on the inner-cabin side of the base root is higher than a height from the top end of said foam seal lip to the surface on the outer-cabin side of the base root.

14. The door weather strip as claimed in claim 11, wherein: a surface on an outer-cabin side of a base root as a border of the foam seal lip formed on a surface of said extrusion molded part installation base member is closer to the peripheral edge of said door than a surface on an inner-cabin side, thereby forming the foam seal lip on an uneven base; and a height from a top end of said foam seal lip to the surface on the inner-cabin side of the base root is higher than a height from the top end of said foam seal lip to the surface on the outer-cabin side of the base root.

15. The door weather strip as claimed in claim 10, wherein: said die molded seal lip is substantially perpendicular to said die molded part installation base member from the position of connection to the position on the straight part on the roof side of said die molded part; and said die molded seal lip inclines towards an outer-cabin side with respect to said die molded part installation base member from the position on the straight part on the roof side of said die molded part to the position on said curve.

16. The door weather strip as claimed in claim 15, wherein: a surface on an outer-cabin side of a base root as a border of the foam seal lip formed on a surface of said extrusion molded part installation base member is closer to the peripheral edge of said door than a surface on an inner-cabin side, thereby forming the foam seal lip on an uneven base; and a height from a top end of said foam seal lip to the surface on the inner-cabin side of the base root is higher than a height from the top end of said foam seal lip to the surface on the outer-cabin side of the base root.

17. The door weather strip as claimed in claim 10, wherein: a surface on an outer-cabin side of a base root as a border of the foam seal lip formed on a surface of said extrusion molded part installation base member is closer to the peripheral edge of said door than a surface on an inner-cabin side, thereby forming the foam seal lip on an uneven base; and a height from a top end of said foam seal lip to the surface on the inner-cabin side of the base root is higher than a height from the top end of said foam seal lip to the surface on the outer-cabin side of the base root.

18. The door weather strip as claimed in claim 1, wherein: said die molded seal lip is substantially perpendicular to said die molded part installation base member from the position of connection to the position on the straight part on the roof side of said die molded part; and said die molded seal lip inclines towards an outer-cabin side with respect to said die molded part installation base member from the position on the straight part on the roof side of said die molded part to the position on said curve.

19. The door weather strip as claimed in claim 18, wherein: a surface on an outer-cabin side of a base root as a border of the foam seal lip formed on a surface of said extrusion molded part installation base member is closer to the peripheral edge of said door than a surface on an inner-cabin side, thereby forming the foam seal lip on an uneven base; and a height from a top end of said foam seal lip to the surface on the inner-cabin side of the base root is higher than a height from the top end of said foam seal lip to the surface on the outer-cabin side of the base root.

20. The door weather strip as claimed in claim 1, wherein: a surface on an outer-cabin side of a base root as a border of the foam seal lip formed on a surface of said extrusion molded part installation base member is closer to the peripheral edge of said door than a surface on an inner-cabin side, thereby forming the foam seal lip on an uneven base; and a height from a top end of said foam seal lip to the surface on the inner-cabin side of the base root is higher than a height from the top end of said foam seal lip to the surface on the outer-cabin side of the base root.

* * * * *